(12) United States Patent
Shimomura et al.

(10) Patent No.: US 7,850,296 B2
(45) Date of Patent: Dec. 14, 2010

(54) INKJET INK RESERVOIR

(75) Inventors: Masako Shimomura, Yokohama (JP); Katsuya Tao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/797,380

(22) Filed: May 3, 2007

(65) Prior Publication Data

US 2007/0282043 A1  Dec. 6, 2007

(30) Foreign Application Priority Data

May 31, 2006  (JP)  ............................. 2006-151980

(51) Int. Cl.
- B41J 2/175 (2006.01)
- C08K 5/49 (2006.01)
- C08K 5/51 (2006.01)
- C08K 5/524 (2006.01)
- C08G 18/77 (2006.01)

(52) U.S. Cl. ............................ 347/86; 347/85; 524/115; 524/128

(58) Field of Classification Search .................. 524/128, 524/115; 347/85, 86

See application file for complete search history.

(56) References Cited

U.S. PATENT DOCUMENTS

| 6,365,701 | B1 | 4/2002 | Hayashi et al. ................ 528/75 |
| 6,698,871 | B1 | 3/2004 | Hayashi et al. ............... 347/86 |
| 2004/0114001 | A1 * | 6/2004 | Hayashi et al. ................ 347/86 |
| 2005/0089850 | A1 * | 4/2005 | Van Ness et al. ................ 435/6 |
| 2006/0050114 | A1 * | 3/2006 | Aoi et al. ........................ 347/86 |
| 2006/0051587 | A1 * | 3/2006 | Mori et al. ................... 428/413 |
| 2007/0064059 | A1 | 3/2007 | Inamoto et al. ............... 347/64 |

FOREIGN PATENT DOCUMENTS

| JP | 11-240182 | 9/1999 |
| JP | 2000-43290 | 2/2000 |
| JP | 3308113 | 5/2002 |
| JP | 3575034 | 7/2004 |
| WO | WO 2004033545 A1 * | 4/2004 |

OTHER PUBLICATIONS

Chemical Society of Japan, Society of Polymer Science, "New Development of Polymeric Additives", Japan, Nikkan Kogyo Shimbun, Ltd., Sep. 30, 1998, pp. 122 to 126 (with translation).

* cited by examiner

*Primary Examiner*—Mark Eashoo
*Assistant Examiner*—Angela C Scott
(74) *Attorney, Agent, or Firm*—Fitzpatrick, Cella, Harper & Scinto

(57) ABSTRACT

An ink jet ink reservoir having a part of its members formed of a polyolefin resin is provided which is free from printing defects caused by filter clogging attributable to a compound derived from an antioxidant. An ink jet ink reservoir used in an ink jet recording apparatus, wherein a part of constituent members of the ink jet ink reservoir is formed of a polyolefin resin, wherein the polyolefin resin contains as additive an antioxidant at least with a hindered phenol skeleton and a phosphorus antioxidant more hydrophobic than bis(2,6-di-t-butylphenyl) pentaerythritol diphosphite (denoted by P-6). The members are free from a phosphorus antioxidant having hydrophobicity equal to or lower than the above P-6.

2 Claims, 6 Drawing Sheets

INKJET INK RESERVOIR

BACKGROUND OF THE INVENTION

1. Field of the Invention

The present invention relates to an ink jet ink reservoir used in an ink jet recording apparatus.

2. Description of the Related Art

Conventionally, an ink jet recording apparatus has an ink jet head cartridge having a general construction wherein an ink reservoir (sometimes referred to as "ink tank") for storing an ink and an ink jet recording head portion for ejecting the ink to conduct printing are connected to each other directly or via an ink-feeding member such as a tube. In such an ink jet recording apparatus, resin materials, metallic materials, rubber materials and the like have heretofore been used for members always contacting with an ink. Of these materials, the resin materials have preferably been used from the viewpoints of cost and processability.

Examples of the resin materials include polyolefins, ABS (acrylonitrile butadiene styrene), PS (polystyrene), PET (polyethylene terephthalate) and PVC (polyvinyl chloride). Of these resin materials, polyolefin resins are particularly preferably utilized from the viewpoints of chemical resistance, recyclability, transparency, easiness of molding and cost. Examples of the polyolefin resins include polyethylene, polypropylene and ethylene-propylene copolymers.

In the case of polyolefin resins, a chloride compound derived from a chlorine-based Ziegler-Natta catalyst used at the time of resin synthesis remains in the polymer and is corroded and yellowed. Therefore, it is known that fatty acid salts or hydrotalcites may be added as a neutralizer. Further, to enhance transparency, it is general to add a nucleating agent that facilitates the production of resin crystal cores and grows fine crystals. A lubricant such as wax may be added to improve mold release properties after molding.

Further, it is generally known that various antioxidants are added to a polyolefin resin for the purpose of stabilizing the quality. Particularly, in a process for melting and drawing a resin into a fiber form as well as in a process of the hot melt molding, autoxidation of the resin (resin deterioration) is likely to occur due to heat-induced oxygen radical, since the resin has a larger surface area. Therefore, it is known to use a phenolic antioxidant or a combination of a phenolic antioxidant and a phosphorus antioxidant. A phenolic antioxidant with a hindered phenol skeleton instantly captures oxygen radical generated by heat to be a peroxide. The generated peroxide becomes a quinone, which yellows a resin, causing difficulties in reproducing and recycling the resin. However, if a phosphorus antioxidant is used in combination therewith, the phosphorus antioxidant reduces the peroxide thereby to reproduce the original phenolic antioxidant, thus facilitating resin recycling.

It is known that a sulfur antioxidant is used additionally after molding to prevent the deterioration by oxygen radical generated by light, heat, ozone, etc. (for example, "Kobunshi tenkazai no shin-tenkai (New development of Polymeric Additives" edited by Chemical Society of Japan, Society of Polymer Science, Japan, published by Nikkan Kogyo Shimbun, Ltd., Sep. 30, 1998).

However, the above conventional technologies have the following problems. A phosphorus antioxidant functions as a reducing agent under a heated environment mainly at the time of molding, and a phosphorus atom is changed from trivalent to pentavalent to capture oxygen. The generated pentavalent phosphorus compound has a higher polarity than the trivalent one, and is easily dissolved in an aqueous ink jet ink (hereafter referred to simply as "ink"). The generated pentavalent phosphorus compound is in contact with an ink for a long period of time or may be dissolved in the ink even for a short period if placed at a high temperature. The solubility of a pentavalent phosphorus compound in an ink is dependent on the kind of color material and solvent composition in the ink, or pH though the reason for that is yet unknown. Further, the phosphorus compound is precipitated on stainless filter provided at several locations of an ink flow path of an ink jet printer for filtrating dust thereby to prevent the flow of ink, finally leading to a problem of printing defects caused by insufficient ink supply.

Japanese Patent No. 3575034 discloses that use of a phenolic antioxidant with an isocyanurate skeleton enhances wettability of an ink reservoir or ink-contacting member, thus improving ink tracking property. Further, the Patent discloses that a phosphinopropionate compound is effective as an antioxidant. Japanese Patent No. 3308113 discloses that an acidic phosphonic acid derivative, which is the hydrolysate of an oxide as a phosphorus antioxidant, has a mold release effect as an internal lubricant. However, both patents do not refer to the solubility of a phosphorus antioxidant in an ink jet ink.

Japanese Patent Application Laid-Open No. H11-240182 discloses in its Examples that an absorber composed of a polypropylene core material and a polyethylene sheath material is mounted on an ink tank prepared from NORIL (modified polyphenylene oxide) manufactured by GE plastics. Sulfur, phenolic and phosphorus antioxidants are added to each of the polypropylene core material and polyethylene sheath material. To the core and sheath materials, bis(2,4-di-t-butylphenyl)pentaerythritol diphosphite and tris(2,4-di-t-butylphenyl)phosphite are added, respectively, as phosphorus antioxidant.

The above ink tank was filled with an ink and allowed to stand at room temperature for several months. Thereafter, the printing was performed. The discharge of the ink was gradually reduced and finally stopped completely. This took place because of clogging of oxides of bis(2,4-di-t-butylphenyl) pentaerythritol diphosphite used in the core material at a stainless filter located at a connection part between the ink tank and a tip tank (a structure carrying an ink jet head).

SUMMARY OF THE INVENTION

The present invention is to provide an ink jet ink reservoir having a part of its members formed of a polyolefin resin is provided which is free from printing defects caused by filter clogging attributable to a compound derived from an antioxidant even when allowed to stand room temperature for a long period or exposed to a high temperature.

The above object is achieved by the present invention as described below. In an ink jet ink reservoir used for an ink jet recording apparatus, at least a part of constituent member of the ink jet ink reservoir is formed of a polyolefin resin; the polyolefin resin includes an antioxidant at least with a hindered phenol skeleton and a phosphorus antioxidant as additive; and the phosphorus antioxidant is more hydrophobic than bis(2,6-di-t-butylphenyl) pentaerythritol diphosphite.

In the present invention, a phosphorus antioxidant has been selected, which is less soluble in a standard ink jet ink and more hydrophobic than bis(2,6-di-t-butylphenyl) pentaerythritol diphosphite. Combined use of such a phosphorus antioxidant and an antioxidant with a hindered phenol skeleton rarely causes yellowing or thermal degradation of a resin even though a polyolefin is thermoformed under the conditions such as a gas furnace that generates nitrogen oxides. Further, even when the prepared ink jet ink reservoir is filled with an ink jet ink, and in contact with the ink jet ink at room temperature for a long period or exposed to a high temperature, the elution of the antioxidant into the ink is reduced since a phosphorus antioxidant more hydrophobic than bis(2,6-di-t-butylphenyl) pentaerythritol diphosphite is selected and no phosphorus antioxidant having hydrophobicity equal to or lower than bis(2,6-di-t-butylphenyl) pentaerythritol diphosphite is added. Thus, filter clogging can be prevented, which is attributable to a compound derived from an antioxidant, particularly an oxide of a phosphorus antioxidant, and thereby an ink jet ink reservoir capable of high quality printing can be provided.

Further features of the present invention will become apparent from the following description of exemplary embodiments with reference to the attached drawings.

DESCRIPTION OF THE EMBODIMENTS

Figure 1:
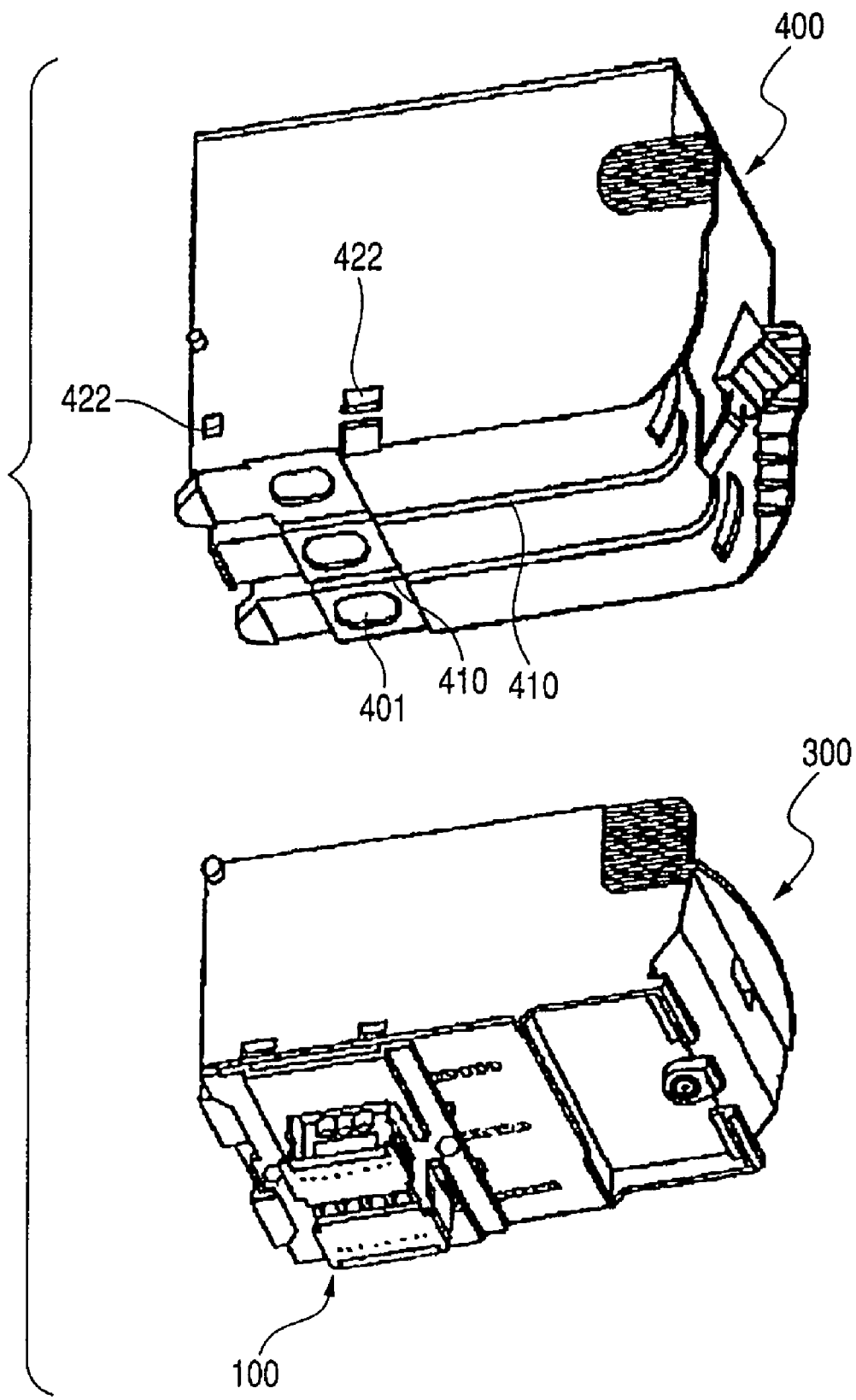
FIG. 1 is an exploded perspective view of a holder and an ink jet ink reservoir according to one embodiment of the present invention.

Next, the present invention will be described in detail by referring to preferred embodiments. In an ink jet ink reservoir of the present invention, at least a part of members constituting the container is preferably formed of a polyolefin resin such as polypropylene or polyethylene.

Next, a phosphorus antioxidant used in the present invention is described in detail. A phosphorus compound (phosphine) is known to have a strong reducing effect. When a phosphorus antioxidant and a phenolic antioxidant are used in combination, the phenolic antioxidant plays a main role in capturing active oxygen generated at the time of molding and is thereby changed into a peroxide. Then, the phosphorus antioxidant reduces the resulting peroxide of the phenolic antioxidant so that the phenolic antioxidant is reproduced. At the same, the phosphorus antioxidant itself is oxidized and a polarity of the resulting oxide of phosphorus antioxidant becomes higher and the resulting oxide thereof is more easily dissolved in an ink. Oxides of bis(2,6-di-t-butylphenyl)pentaerythritol diphosphite are precipitated at narrow and complex portions of an ink flow path such as a filter, though the reason for that is yet unknown. When oxides are precipitated at narrow portions of the ink flow path such as a filter, the ink cannot be supplied smoothly and finally the ink is not supplied to a nozzle, resulting in no ink discharge.

An amount of antioxidant dissolved in an ink of an ink tank having filter clogging is measured using a high performance liquid chromatograph. The oxide amount of bis(2,6-di-t-butylphenyl)pentaerythritol diphosphite as phosphorus antioxidant is the largest.

This oxide had the shortest elution time in high performance liquid chromatography, thus having low hydrophobicity. It was expected that, when this oxide is added into a polyolefin resin material, etc., the oxide would become free from the material more easily and be dissolved more in an ink than other antioxidants or oxides thereof.

Other phosphorus antioxidants or oxides thereof, such as tris(2,4-di-t-butylphenyl)phosphite (trade name: Irgafos 168 (Ciba Specialty Chemicals)), caused no filter clogging. They had long elution times in high performance liquid chromatography, indicating a high hydrophobicity. It was expected that, when they are added into a polyolefin resin material, etc., they would hardly become free from the material and be hardly dissolved in an aqueous ink jet ink.

Paying attention on the above measurement results, phosphorus antioxidants more hydrophobic than bis(2,6-di-t-butylphenyl)pentaerythritol diphosphite were searched for. As a result of this search, the oxides of these phosphorus antioxidants were found to be more hydrophobic than the oxides of bis(2,6-di-t-butylphenyl)pentaerythritol diphosphite. It was expected that the oxides would be less easy to be free from a relevant member and less soluble in an ink jet ink. Further, there were no printing problems due to antioxidants when an ink jet ink reservoir was prepared and used for printing which was loaded with phosphorus antioxidants more hydrophobic than bis(2,6-di-t-butylphenyl)pentaerythritol diphosphite.

A phosphorus antioxidant used in the present invention is more hydrophobic than bis(2,6-di-t-butylphenyl)pentaerythritol diphosphite, and a phosphorus antioxidant having hydrophobicity equal to or lower than bis(2,6-di-t-butylphenyl) pentaerythritol diphosphite is not used. In the present invention, the hydrophobicity is evaluated using liquid chromatography. Specifically, the elution times of phosphorus antioxidants and bis(2,6-di-t-butylphenyl)pentaerythritol diphosphite are measured by liquid chromatography. Then, phosphorus antioxidants having a longer elution time than bis(2,6-di-t-butylphenyl)pentaerythritol diphosphite may be selected. The measurement conditions are not particularly limited, but a reversed-phase silica column (trade name C8 (4.5 mm×150 mm) manufactured by Agilent) is preferably used. When that column is used, methanol/water mixture is preferably used as an eluant. The measurement is preferably performed while the volume ratio of methanol/water is continuously varied from 70/30 to 100/0 (mass ratio).

As a phosphorus antioxidant to be used in the present invention, the following antioxidants can be used in view of a function of a phosphorus antioxidant as a reductant (reactivity) and heat-resistance at the time of molding in addition to high hydrophobicity.

Specifically, preferred examples of phosphorus antioxidants include tris(2,4-di-t-butylphenyl)phosphite, 6-[3-(3-t-butyl-4-hydroxy-5-methyl)propoxy]-2,4,8,10-tetra-t-butyldibenz[d,f][1,3,2]-dioxaphosphepin, bis(2,6-di-t-butyl-4-methylphenyl) pentaerythritol diphosphite, distearyl pentaerythritol diphosphite, and 2,2'-methylenebis(4,6-di-t-butylphenyl)octylphosphite.

The formula (1) of tris(2,4-di-t-butylphenyl)phosphite is shown below. Tris(2,4-di-t-butylphenyl)phosphite is commercially available under the trade names such as Irgafos 168 (Ciba Specialty Chemicals), ADK STAB 2112 (Asahi Denka Co., Ltd.), and Sumilizer P-16 (Sumitomo Chemical Co., Ltd.).

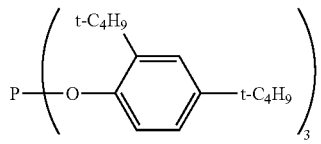

(Formula 1)

(1)

Further, the formula (2) of bis(2,6-di-t-butyl-4-methylphenyl) pentaerythritol diphosphite is shown below. Bis(2,6-di-t-butyl-4-methylphenyl) pentaerythritol diphosphite is commercially available under the trade name of ADK STAB PEP-36 (Asahi Denka Co., Ltd.).

(Formula 2)

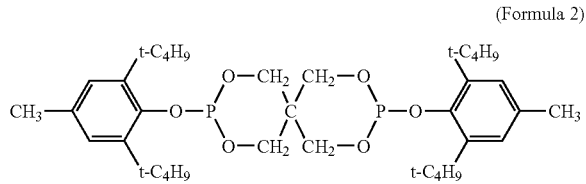

Furthermore, the formula (3) of distearyl pentaerythritol diphosphite is shown below. Distearyl pentaerythritol diphosphite is commercially available under the trade name of ADK STAB PEP-8 (Asahi Denka Co., Ltd.).

(Formula 3)

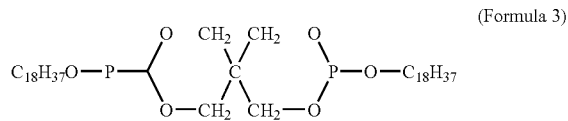

Further, the formula (4) of 6-[3-(3-t-butyl-4-hydroxy-5-methyl)propoxy]-2,4,8,10-tetra-t-butyldibenz[d,f][1,3,2]-dioxaphosphepine is shown below. 6-[3-(3-t-butyl-4-hydroxy-5-methyl)propoxy]-2,4,8,10-tetra-t-butyldibenz[d,f][1,3,2]-dioxaphosphepin is commercially available under the trade name of Sumilizer GP (Sumitomo Chemical Co., Ltd.).

(Formula 4)

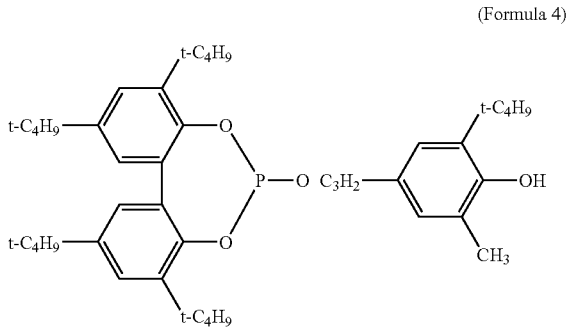

Moreover, the formula (5) of 2,2'-methylenebis(4,6-di-t-butylphenyl)octylphosphite is shown below. 2,2'-methylenebis(4,6-di-t-butylphenyl)octylphosphite is commercially available under the trade name of ADK STAB HP-10 (Asahi Denka Co., Ltd.).

(Formula 5)

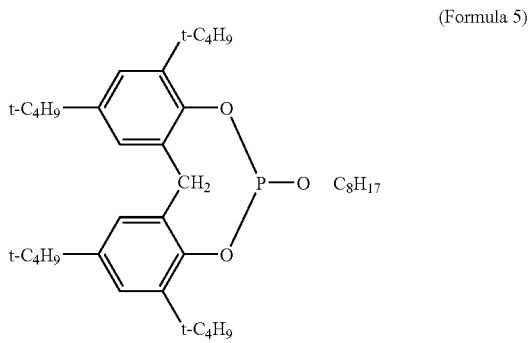

Phosphorus antioxidants other than the above can be used as phosphorus antioxidants for the present invention as long as they have higher hydrophobicity than bis(2,6-di-t-butylphenyl) pentaerythritol diphosphite.

Further, a compound such as Sumilizer GP having both phosphine and hindered phenol skeletons works by itself as phosphorus antioxidant and phenolic antioxidant. Thus, it is not necessary to use an antioxidant having a hindered phenol skeleton in combination.

The above phosphorus antioxidants may be used either alone or in combination of two kinds or more thereof. The above phosphorus antioxidant may be usually added in an amount of, preferably from 100 ppm to 2,000 ppm with respect to a polyolefin resin, more preferably 500 ppm to 1,000 ppm.

Next, an antioxidant to be used in the present invention having a hindered phenol skeleton will be described. Any of commercially available antioxidant having a hindered phenol skeleton is usable. Examples thereof include 1,3,5-tris(3',5'-di-t-butyl-4'-hydroxybenzyl)-S-triazine-2,4,6-(1H,3H,5H) trione [Trade name: ADK STAB AO-20 (Asahi Denka Co., Ltd.)], 1,1,3-Tris(2-methyl-4-hydroxy-5-t-butylphenyl)butane [Trade name: ADK STAB AO-30 (Asahi Denka Co., Ltd.), Trade name: Yoshinox 930 (API Corporation)], 4,4'-Butylidenebis(3-methyl-6-t-butylphenol) [Trade name: ADK STAB AO-40 (Asahi Denka Co., Ltd.), Trade name: Yoshinox BB (API Corporation)], stearyl-β-(3,5-di-t-butyl-4-hydroxyphenyl)propionate [Trade name: ADK STAB AO-50 (Asahi Denka Co., Ltd.), Trade name: Tomix SS (API Corporation), Trade name: ADK STAB AO-75 (Asahi Denka Co., Ltd.)], 3,9-bis[1,1-dimethyl-2-[β-(3-t-butyl-4-hydroxy-5-methylphenyl)propionyloxy]ethyl]-2,4,8,10-tetraoxaspiro[5,5] undecane [Trade name: ADK STAB AO-80 (Asahi Denka Co., Ltd.)], 1,3,5-trimethyl-2,4,6-tris(3,5-di-t-butyl-4-hydroxybenzyl)benzene [Trade name: ADK STAB AO-330 (Asahi Denka Co., Ltd.)], 2,6-di-t-butyl-p-cresol [Trade name: Yoshinox BHT (API Corporation), Trade name: Yoshinox BHT-P (Yoshitomi Pharmaceutical Industries, Ltd.)], 4,4'-thiobis(3-methyl-6-t-butylphenol) [Trade name: Yoshinox SR ((Yoshitomi Pharmaceutical Industries, Ltd.)], 2,2'-methylenebis(4-methyl-6-t-butylphenol) [Trade name: Yoshinox 2246G (API Corporation), Trade name: Yoshinox 2246R (Yoshitomi Pharmaceutical Industries, Ltd.)], 2,2'-methylenebis(4-ethyl-6-t-butylphenol) [Trade name: Yoshinox 425 (API Corporation)], tetrakis[methylene-3-(3',5'-di-t-butyl-4'-hydroxyphenyl)propionate]methane [Trade name: Irganox 1010 (Ciba Specialties Chemicals), Trade name: ADK STAB AO-60 ((Asahi Denka Co., Ltd.)], and 2,6-di-t-butyl-4-ethylphenol [Trade name: Yoshinox 250 (API Corporation), Trade name: Tomix TT (Yoshitomi Pharmaceutical Industries, Ltd.), Trade name: Sumilizer S (Sumitomo Chemical Co., Ltd.)]. Other antioxidants having a hindered phenol skeleton may be used.

The antioxidants having a hindered phenol skeleton may be used either alone or in combination of two or more kinds thereof. The above antioxidant having a hindered phenol skeleton may be usually added in an amount of, preferably from 100 ppm to 2,000 ppm with respect to a polyolefin resin, more preferably 500 ppm to 2,000 ppm.

Further, other additives can be added to a polyolefin resin to be used for an ink jet ink reservoir of the present invention. Major additives include: sulfur antioxidants; ultraviolet absorbers such as hindered amines, benzotriazoles, benzophenones, and salicylate; nucleating agent for inducing transparency such as gelols; higher fatty acid salts for neutralizing catalyst residues such as calcium stearate; hydroxides such as hydrotalcites and calcium hydroxide; mold release agents for improving mold release properties; flame retardants; plasticizers; antistatic agents; and colorants.

A polyolefin resin causes oxidization degradation by a heavy metal. Thus, usable as a heavy metal deactivator are metallic soaps, hydrotalcites, salicylic acid derivatives such as ADK STAB CDA-1, ADK STAB CDA-6 (trade name) (Asahi Denka Co., Ltd.), hydrazide derivatives such as Irganox MD 1024 (trade name) (Ciba S. P), oxamide derivatives such as Naugard XL-1 (trade name) (Uniroyal), and sulfur-containing phosphates such as Hostanox OSP-1 (trade name) (Hoechst).

Particularly, when a sulfur antioxidant is used in combination with an antioxidant having a hindered phenol skeleton in the same manner as a phosphorus antioxidant, a synergistic effect is expected. Examples of the sulfur antioxidants include dialkylthiodipropionate, and major alkyl groups therein include dodecyl, tetradecyl, and octadecyl. Further, exemplary major alkyl groups include tetrakis[methylene (3-dodecyl)]. These sulfur antioxidants may be used either alone or in combination of two or more thereof. The sulfur antioxidants can usually be added preferably in an amount of from 500 ppm to 1,000 ppm with respect to a polyolefin resin.

These additives may be used after sufficient studies on whether they have elution problems or whether they exert adverse influences with due consideration on their solubility in an ink jet ink.

Figure 2:
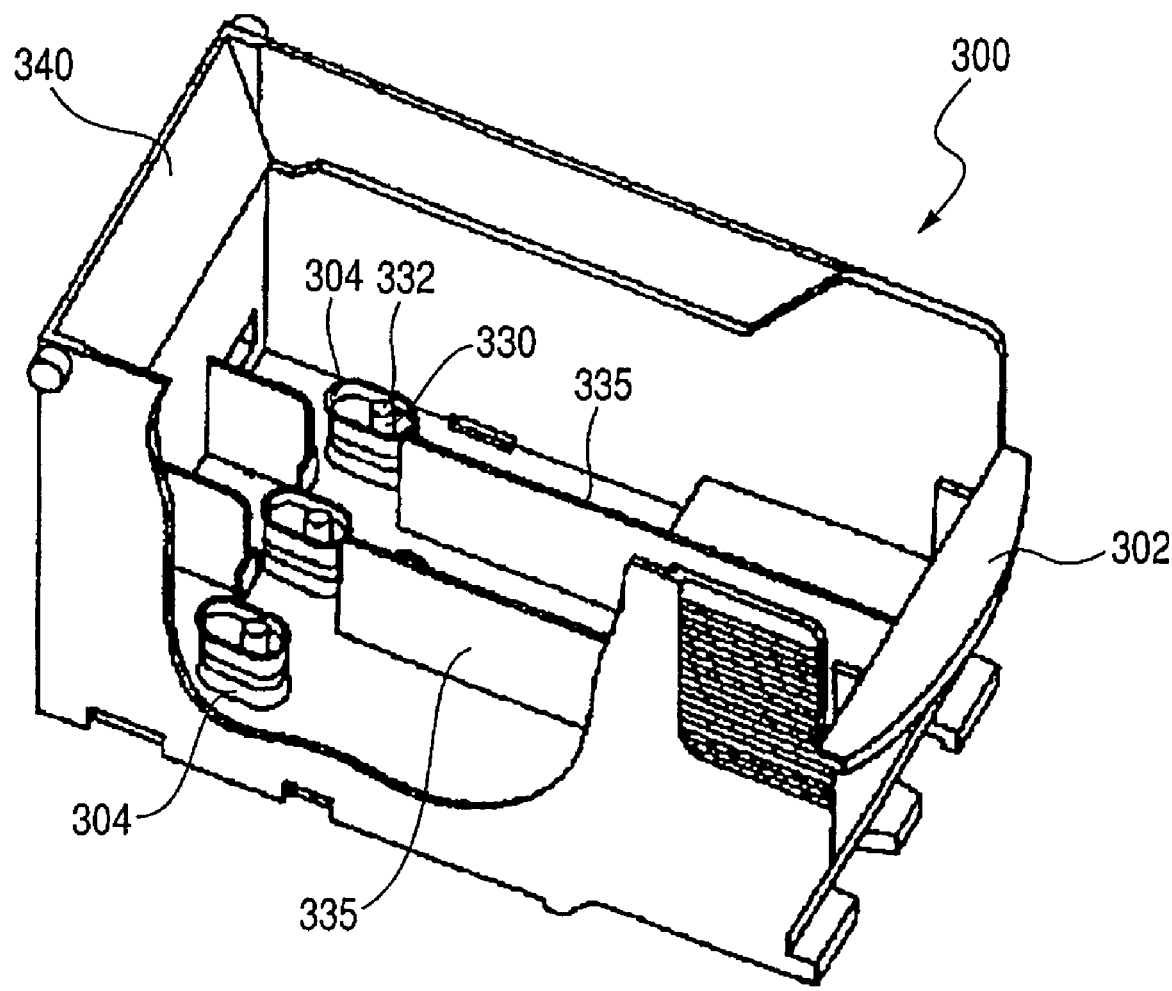
FIG. 2 is a partially cutaway perspective view of the holder according to the present invention.
Figure 4:
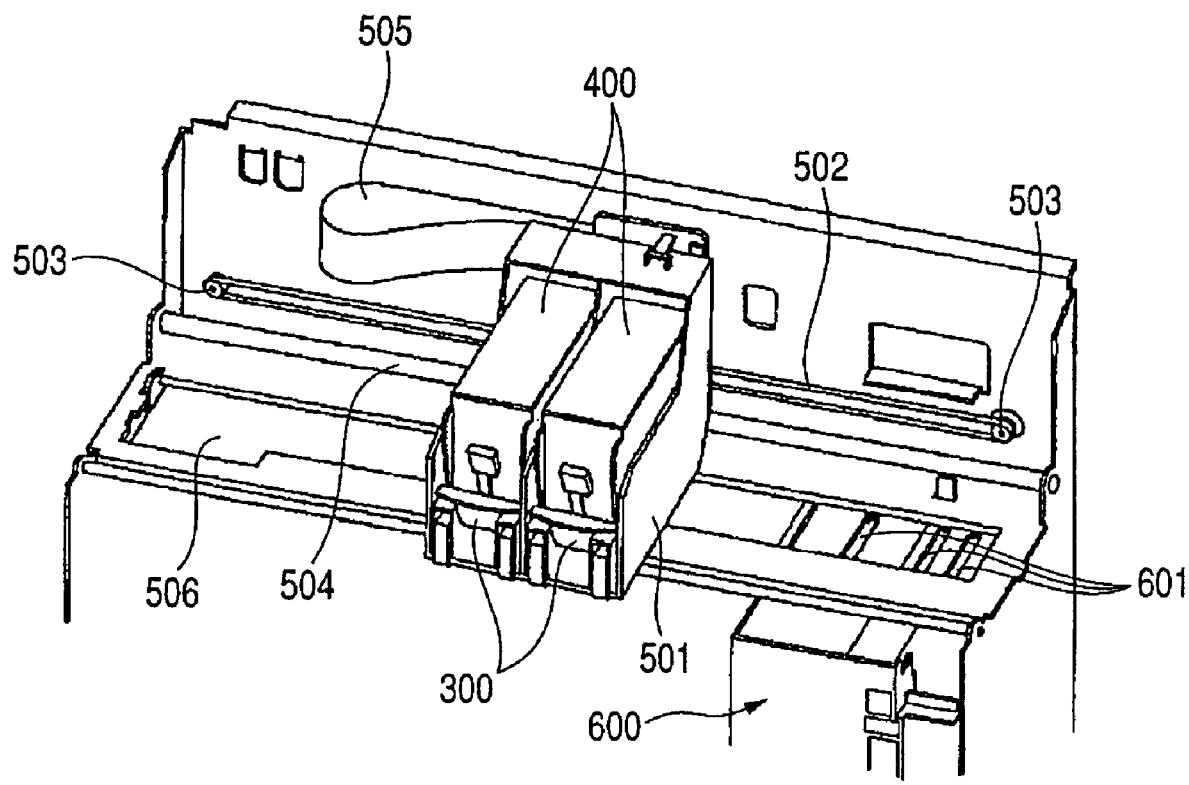
FIG. 4 is a perspective view schematically illustrating an ink jet recording apparatus.

Hereafter, preferred embodiments of the present invention will be described more specifically by the figures. FIG. 1 is a perspective view illustrating an ink tank 400 as an ink jet ink reservoir according to one embodiment of the present invention, and a holder 300 holding the ink tank on a carriage 501 (see FIG. 4). The figure illustrates the ink tank 400 as viewed from an ink supply opening. Further, FIG. 2 is a partially cutaway perspective view of the holder 300, particularly illustrating a connection part to the ink tank 400.

Figure 3A:
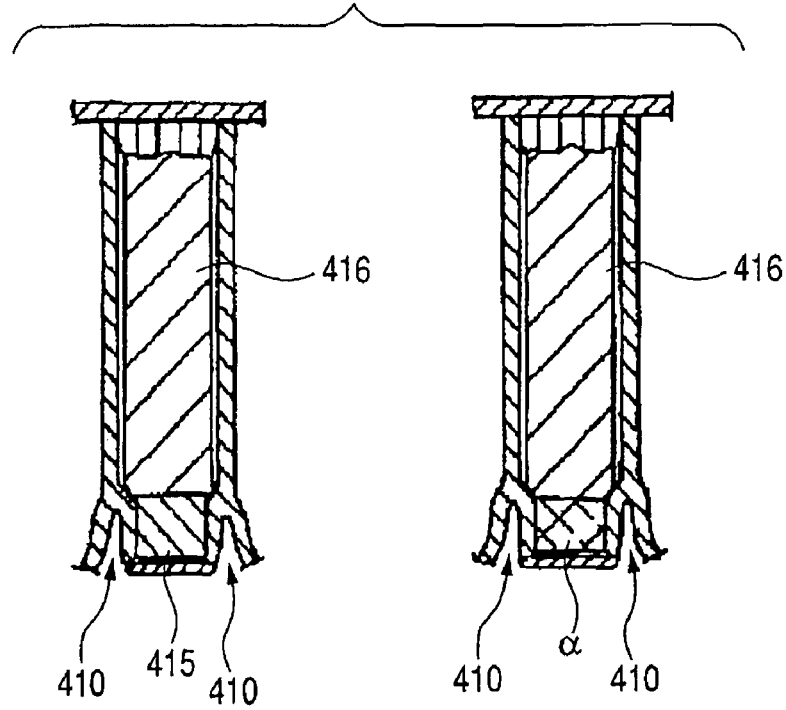
FIGS. 3A and 3B are cross sectional views of the ink jet ink reservoir according to one embodiment of the present invention.
Figure 3B:
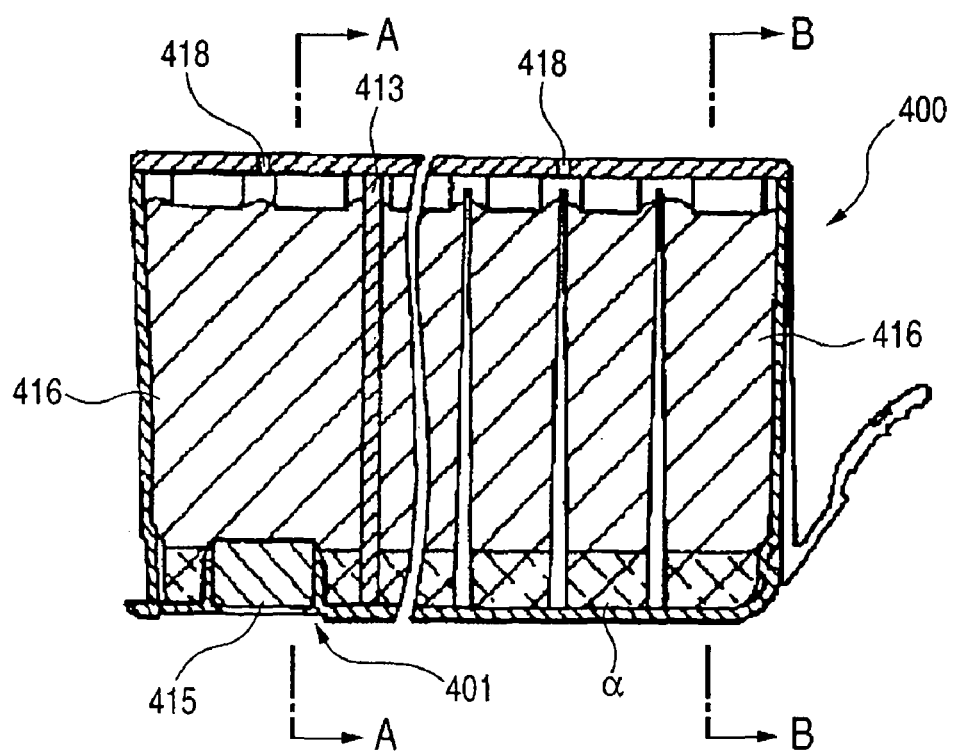

The holder 300 is integrally provided with an ink jet head 100 as described below, and is removably mounted on the carriage 501 of an ink jet recording apparatus. As illustrated in FIGS. 1 and 2, the holder 300 has nearly a box shape with its top face open, and an upper half of one end face of the box shape is cut away so that a flange part 302 is formed so as to be projected from the cutaway part. Further, an opposite end face to the above one end face is extended while its upper half is outwardly tilted as a flexed part 340. Furthermore, the holder 300 has three chimney-like supply tubes 330 on a bottom thereof, and the tube has a filter 332 at its tip surrounded by an elastic member 304. FIG. 1 illustrates an embodiment having three supply tubes 330. However, the present invention is not limited thereto, and any number of supply tubes can be provided. By mounting the ink tank 400 on the holder 300, this allows three kinds (or an arbitrary number) of inks in the ink tank 400 to be supplied to the ink jet head 100. In other words, the supply tube 330 of the holder 300 has the filter 332 that is in contact with a capillary force generating member 415 (see FIG. 3) provided at the ink supply opening 401 of the ink tank 400. Further, the elastic member 304 seals peripheries of the ink supply opening 401 and the supply tube 330. This prevents the evaporation of ink and enables good ink supply.

Figure 5:
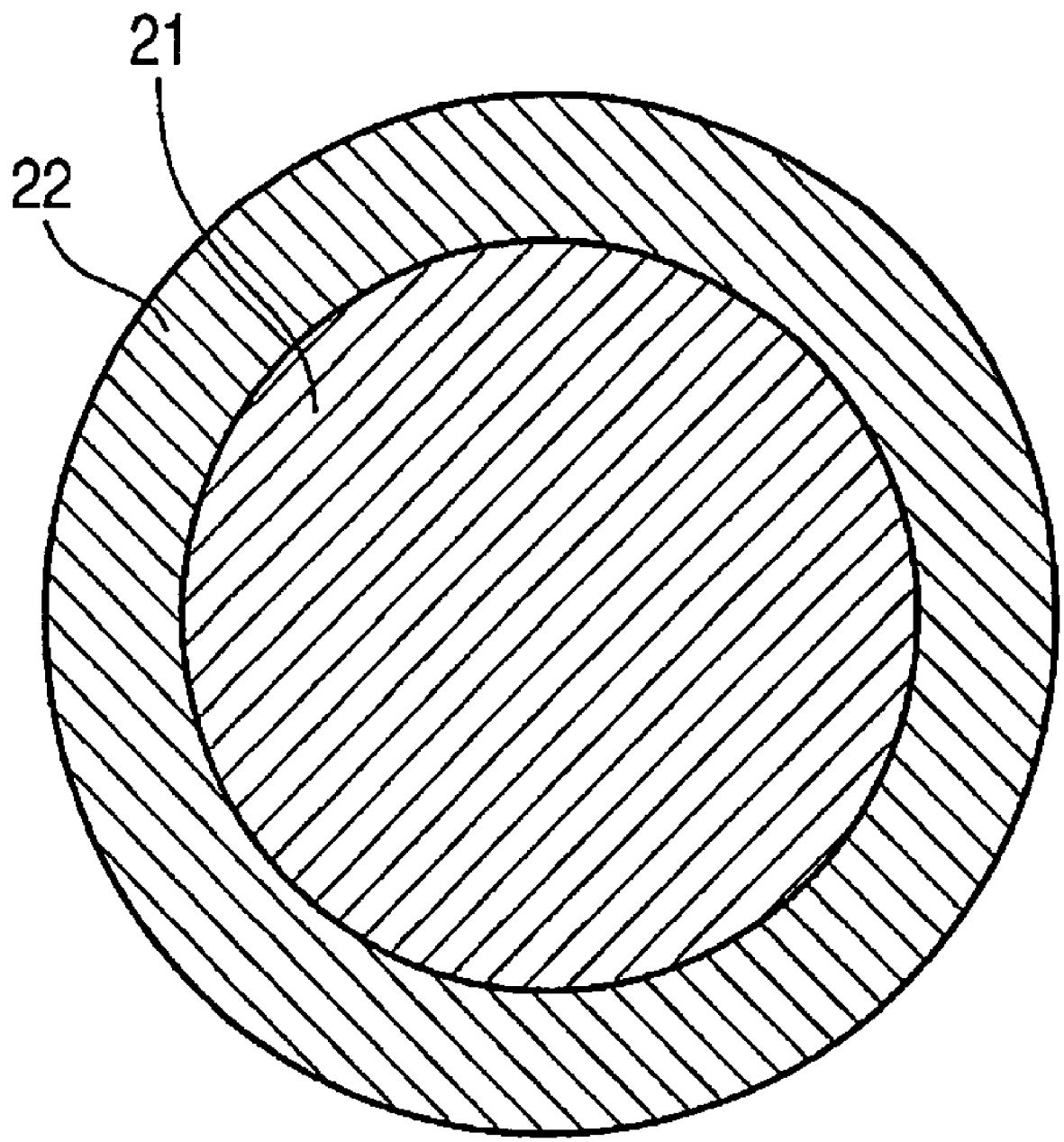
FIG. 5 is a cross sectional view of one example of a fiber constituting an ink absorber of the present invention.

The ink tank 400 stores the above-mentioned three kinds (or arbitrary number) of inks in separate receiving chambers isolated by predetermined members. Each receiving chamber stores a capillary force generating member 416 (see FIG. 3) so that the member occupies a large part thereof, and this capillary force generating member 416 holds an ink by capillary force. The ink supply opening 401 is provided at a bottom of each receiving chamber and the ink held by the capillary force generating member 416 is supplied to the ink jet head 100 via the ink supply opening 401. That is, the capillary force generating member 415 (see FIG. 3) is provided at each ink supply opening 401, and the member is formed of fibers having a cross section, as illustrated in FIG. 5, of a core part 21 and a sheath part 22. This capillary force generating member 415 is preferably designated to have a larger capillary force than the capillary force generating member 416 for holding an ink in the receiving chamber, and this enables good ink supply.

In the above ink tank (ink jet ink reservoir) of the present invention, at least a part of any members including an exterior of the ink tank, a capillary force generating member, a fibrous capillary force generating member disposed at the ink supply opening, is formed of a polyolefin resin containing the above-mentioned specific antioxidant. The shapes of these members are not limited to the above shapes.

Next, one example of production methods of fibrous capillary force generating member is simply described, which is formed of a polyolefin resin containing an antioxidant having the above-specified phosphorus antioxidant and antioxidant with a hindered phenol skeleton.

First of all, a continuous, elastic fiber aggregate in the form of a rod or plate is molded from a polyolefin resin containing the above-specific phosphorus antioxidant and an antioxidant with a hindered phenol skeleton. The continuous fiber aggregate is then cut by a cutter into standard units to form fiber masses. The fiber mass is inserted by compression into a predetermined mold and heated in a heating furnace to form a capillary force generating member having a predetermined shape. The heating furnace may be either a gas furnace or an electric furnace, but the amount of nitrogen oxides contained in a gas furnace is generally large and such nitrogen oxides easily oxidize an antioxidant. Thus, an electric furnace is preferably used.

At this time, the fiber constituting the above fiber mass is preferably formed of a fiber having a structure illustrated in FIG. 5, which has a core part 21 of polypropylene and a sheath part 22 of polyethylene. The outer diameter of the fiber is not particularly limited. The temperature of the heating furnace may be optional as long as it is higher than the melting point of the polyethylene constituting the sheath part 22 and lower than the melting point of the polypropylene constituting the core part 21. For example, in the case where the melting point of the polyethylene of the sheath part 22 is 132° C., the temperature of the heating furnace is preferably from 135° C. to 155° C. The heating time can be adjusted according to the strength necessary for the capillary force generating member.

In a capillary force generating member formed by the above production method, the polyethylene of the sheath part is melted by heating to function as an adhesive and the polypropylene fiber of the core part is fixed at three-dimensionally intertwined points, so that the member has a mass structure with a large strength.

The capillary force generating member is not limited to one formed with a core-sheath composite fiber of two kinds of polyolefin resin materials, which are produced by the above production method. Two or more kinds of materials are formed into separate fibers, and these may be mixed. Needless to say, the composition ratio of two kinds of materials is not limited to 1:1, and it may be determined according to the purpose. Alternatively, a single material fiber may be used and fused. Further, the structure is not limited to one wherein one material is used as an adhesive by heating at a predetermined temperature and fixed at three-dimensionally intertwined points of the fiber.

Further, the material constituting the capillary force generating member may be one kind, and its structure may be a nonwoven form like conventionally-known felt. In addition, the fibers formed of a polyolefin resin material and constituting the capillary force generating member may have a linear bundle structure as disclosed in Japanese Patent Application Laid-Open No. H05-8405. Such a structure is advantageous on both ink supply and reduction of the ink remaining amount.

A container and a lid constituting an exterior of an ink tank (ink jet ink reservoir) may be molded using a polyolefin resin containing the above-specific phosphorus antioxidant and an antioxidant with a hindered phenol skeleton. The molding method is not particularly limited, and any suitable one can be selected from known molding methods. Usually, injection molding is preferably employed.

EXAMPLES

Next, the present invention is described further specifically by referring Examples.

Figure 6:
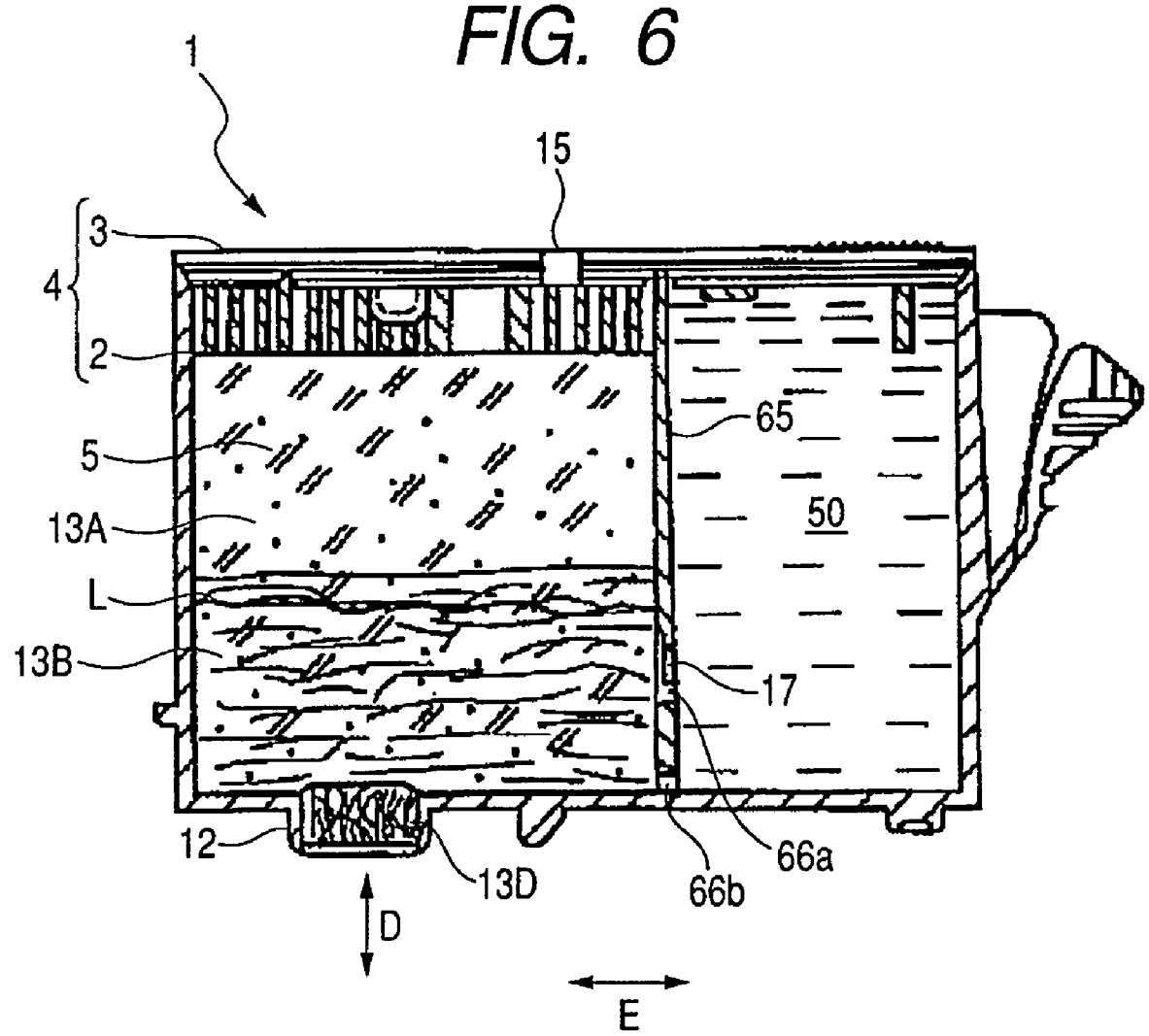
FIG. 6 is a schematic cross sectional view of an ink jet ink reservoir used in Examples and a Comparative Example.

FIG. 6 is a schematic cross sectional view of an ink tank (ink jet ink reservoir) of this Example. In FIG. 6, the ink tank 1 includes a container 2 with an upper part open, a capillary force generating member receiving chamber 5 storing capillary force generating members 13A and 13B, and an ink tank exterior 4 formed by a lid covering a liquid supply container 50. The capillary force generating member receiving chamber 5 communicates with atmosphere via an atmosphere communication opening 15 at its upper part, and communicates at its lower part with an ink supply opening 12 having a capillary force generating member 13D. The receiving chamber 5 is partitioned by a partition wall 65 from the substantially-sealed liquid supply container 50 that receives ink. The partition wall 65 has a communication part 66b at its lower part, which is open for communication between the capillary force generating member receiving chamber 5 and the liquid supply container 50. The communication part 66b allows an ink to go back and forth between the liquid supply container 50 and the capillary force generating member receiving chamber 5. The ink tank 1 is mounted in a printer so that an ink is supplied to an ink jet head (not illustrated) through the ink supply opening 12.

(Production Example of Capillary Force Generating Member)

As the above capillary force generating members (13A, 13B, and 13D), capillary force generating members A to D were prepared as described below.

(Production Example of Capillary Force Generating Member A)

A polyolefin core-sheath composite fiber aggregate was formed using a polypropylene resin (i) (referred to as PP resin (i)) and a polyethylene resin (i) (referred to as PE resin (i)) having the compositions of Table 1. The obtained product was cut by a cutter. The resultant fiber aggregate was inserted by compression into a mold with a predetermined shape and heated in a gas furnace. Then, a capillary force generating member A having a predetermined shape was prepared.

(Production Example of Capillary Force Generating Member B)

A capillary force generating member B was prepared in the same manner as in the production example of capillary force generating member A except that a polypropylene resin (ii) (referred to as PP resin (ii)) and a polyethylene resin (ii) (referred to as PE resin (ii)) having the compositions of Table 1 were used.

(Production Example of Capillary Force Generating Member C)

A capillary force generating member C was prepared in the same manner as in the production example of capillary force generating member A except that a polypropylene resin (iii) (referred to as PP resin (iii)) and a polyethylene resin (iii) (referred to as PE resin (iii)) having the compositions of Table 1 were used.

(Production Example of Capillary Force Generating Member D)

Urethane foam was formed using a polyether polyurethane material free of an antioxidant and a neutralizer as shown in Table 1. The urethane foam was cut by a cutter and a capillary force generating member D having a predetermined shape was prepared.

(Production Example of Container and Lid Constituting Ink Tank Exterior)

In addition, as the container 2 and the lid 3 constituting the ink tank exterior 4, containers (a) and (b) and lids (a) and (b) constituting the following ink tank exteriors (a) and (b) were prepared as described below.

(Production Example of Container (a) and Lid (a) Constituting Ink Tank Exterior (a))

A container (a) and a lid (a) constituting an ink tank exterior (a) was formed by injection molding using a polypropylene resin (C1) (referred to as PP resin (C1)) having the composition of Table 1. The container (a) and the lid (a) constituting the ink tank exterior (a) were prepared so as to have the same shapes as those used for a commercially-available ink cartridge (trade name: BCI-6 (manufactured by Canon Inc.)).

(Production Example of Container (b) and Lid (b) Constituting Ink Tank Exterior (b))

A container (b) and a lid (b) constituting an ink tank exterior (b) were prepared in the same manner as the container (a) and the lid (a) constituting the ink tank exterior (a) except that a polypropylene resin (C2) (referred to as PP resin (C2)) having the composition of Table 1 was used.

TABLE 1

| Ink tank member | Shape of ink tank member | | Name of resin | Resin | Phosphorus antioxidant | | Antioxidant with hindered phenol skeleton | | Sulfur antioxidant | | Neutralizer | |
|---|---|---|---|---|---|---|---|---|---|---|---|---|
| | | | | | Name | Additive amount (ppm) | Name | Additive amount (ppm) | Name | Additive amount (ppm) | Name | Additive amount (ppm) |
| Capillary force generating member A | Core-sheath composite fiber aggregate | Core part | PP resin (i) | PP | P-1 | 500 | H-1 | 1500 | S-1 | 1000 | N-1 | 500 |
| | | Sheath part | PE resin (i) | PE | P-2 | 500 | H-2 | 2000 | S-2 | 1000 | N-1 | 500 |

TABLE 1-continued

| Ink tank member | Shape of ink tank member | | Name of resin | Resin | Phosphorus antioxidant | | Antioxidant with hindered phenol skeleton | | Sulfur antioxidant | | Neutralizer | |
|---|---|---|---|---|---|---|---|---|---|---|---|---|
| | | | | | Name | Additive amount (ppm) | Name | Additive amount (ppm) | Name | Additive amount (ppm) | Name | Additive amount (ppm) |
| Capillary force generating member B | Core-sheath composite fiber aggregate | Core part | PP resin (ii) | PP | P-5 | 500 | H-1 | 1500 | S-1 | 1000 | N-1 | 500 |
| | | Sheath part | PE resin (ii) | PE | P-3 | 500 | H-2 | 2000 | S-2 | 1000 | N-1 | 500 |
| Capillary force generating member C | Core-sheath composite fiber aggregate | Core part | PP resin (iii) | PP | P-6 | 500 | H-1 | 1500 | S-1 | 1000 | N-1 | 500 |
| | | Sheath part | PE resin (iii) | PE | P-1 | 500 | H-2 | 1500 | S-2 | 1000 | N-1 | 500 |
| Capillary force generating member D | Urethane foam | — | Polyether polyurethane | PEU | — | — | — | — | — | — | — | — |
| Ink tank exterior (a) | BCI-6 shape | — | PP resin (C1) | PP | — | — | H-3 | 1000 | | | N-1 | 500 |
| Ink tank exterior (b) | BCI-6 shape | — | PP resin (C2) | PP | P-4 | 500 | — | — | — | — | N-1 | 500 |

Abbreviations in the above table represent the following contents, respectively.
PP: polypropylene
PE: polyethylene
PEU: polyether polyurethane
P-1: Irgafos 168 (trade name) manufactured by Ciba Specialty Chemicals
P-2: ADK STAB PEP-36 (trade name) manufactured by Asahi Denka Co., Ltd.
P-3: ADK STAB PEP-8 (trade name) manufactured by Asahi Denka Co., Ltd.
P-4: Sumilizer GP manufactured by Sumitomo Chemical Co., Ltd.
P-5: ADK STAB HP-10 (trade name) manufactured by Asahi Denka Co., Ltd.
P-6: ADK STAB PEP-24G (trade name) manufactured by Asahi Denka Co., Ltd.
S-1: dimyristyl 3,3'-thiodipropionate
S-2: distearyl 3,3'-thiodipropionate
H-1: 2-t-butyl-6-(3-t-butyl-2-hydroxy-5-methylbenzyl)-4-methylphenyl-acrylate
H-2: 1,3,5-tris(4-t-butyl-3-hydroxy-2,6-dimethylbenzyl)-1,3,5-triazine-2,4,6-(1H,3H,5H)-trione
H-3: Irganox 1010 (trade name) manufactured by Ciba Specialty Chemicals
N-1: DHT-4A (trade name) manufactured by Kyowa Chemical Industry Co., Ltd.

(Ink)
An ink having the following composition was prepared.

| | |
|---|---|
| DBL 199 (manufactured by Nippon Kayaku Co., Ltd.) | 4.5 mass % |
| glycerin | 8.0 mass % |
| diethylene glycol | 8.0 mass % |
| urea | 10.0 mass % |
| Acetylenol E100 (manufactured by Kawaken Fine Chemicals Co., Ltd.) | 0.6 mass % |
| pure water | 68.9 mass % |

(Evaluation of Phosphorus Antioxidant for Hydrophobicity and Ink Tank)

The hydrophobicity of the phosphorus antioxidant used in this Example and the ink tank of this Example were evaluated as stated below.

(Evaluation of Phosphorus Antioxidant for Hydrophobicity)

A methanol solution of 1 ppm phosphorus antioxidant was prepared, and the elution time of the antioxidant was measured by liquid chromatography to evaluate the hydrophobicity of phosphorus antioxidant. The measurement conditions are shown below.

Liquid chromatograph: Agilent 1100
Detector: mass detector (Agilent SL)
Column: Agilent C8 4.5 mm×150 mm
Eluant: methanol/water=70:30 to 100/0
Flow rate: 1 ml/min (Printing Quality)

An ink tank filled with the above ink (I-1) was heated at 70° C. for 2 weeks. Thereafter, the ink tank was mounted on a commercially available printer (trade name: PIXUS 9900i manufactured by Canon Inc.), and a printing pattern (solid pattern) was performed. After a predetermined amount of ink was used, suction recovery operation was performed three times continuously. Then, a reduced weight of the ink tank was measured, and the measured weight was compared with the weight reduction before the printing and evaluated based on the following standard.

A: No suction reduction is observed even after use of 50 tanks.

B: Slight (10% or less) suction reduction is observed after use of 50 tanks, but no problem for printing.

C: Suction reduction is observed after use of less than 50 tanks, and non-discharging nozzle is observed.

(Filter Clogging)

After the above printing quality evaluation was conducted, an SUS filter (susmix Φ 5 μm), which had been attached to a supply tube part of a holder with the ink tank mounted thereon, was taken out and washed with water. Thereafter, the presence of a foreign matter was inspected by an optical microscope, and the filter clogging was evaluated based on the following standard.

A: No foreign matter was confirmed

C: Cotton-like foreign matter was confirmed

Example 1

Used were the above capillary force generating member A as the capillary force generating members (13A, 13B and 13D), the above container (a) as the container 2 constituting the ink tank exterior 4, the above lid (a) as the lid 3, and the above ink (I-1) as the ink. Other than these members, the same members as used in a commercially-available ink cartridge (trade name: BCI-6 manufactured by Canon Inc.) were used to prepare an ink tank. The hydrophobicity of phosphorus antioxidant used in this Example and the ink tank obtained according to this Example were evaluated by the above-described methods. The obtained results are shown in Tables 2 and 3.

Example 2

An ink tank was prepared in the same manner as in Example 1 except that the above capillary force generating member B was used as the capillary force generating members (13A, 13B and 13D). The hydrophobicity of phosphorus antioxidant used in this Example and the ink tank obtained according to this Example were evaluated by the above-described methods. The obtained results are shown in Tables 2 and 3.

Example 3

An ink tank was prepared in the same manner as in Example 1 except that the above capillary force generating member D was used as the capillary force generating member (13A, 13B and 13D) and the above container (b) and lid (b) as the container 2 and lid 3 forming the ink tank exterior 4, respectively. The hydrophobicity of phosphorus antioxidant used in this Example and the ink tank obtained according to this Example were evaluated by the above-described methods. The obtained results are shown in Tables 2 and 3.

Comparative Example 1

An ink tank was prepared in the same manner as in Example 1 except that the above capillary force generating member C was used as the capillary force generating member (13A, 13B and 13D). The hydrophobicity of phosphorus antioxidant used in this Example and the ink tank obtained according to this Example were evaluated by the above-described methods. The obtained results are shown in Tables 2 and 3.

TABLE 2

Elution time of phosphorus antioxidant and solvent ratio (high performance liquid chromatography)

| Phosphorus antioxidant | Methanol concentration at elution (mass %) | | | Elution time (min.) | | |
|---|---|---|---|---|---|---|
| | Parent ion | Mon-oxide | Dioxide | Parent ion | Mon-oxide | Di-oxide |
| ADK STAB PEP-24G (P-6) | 100 | 97 | 88 | 16.7 | 14.1 | 11.1 |
| Sumilizer GP (P-4) | 100 | 100 | — | 17.2 | 15.5 | — |
| ADK STAB PEP-36 (P-2) | 100 | 100 | 94 | 17.1 | 15.1 | 12.9 |
| ADK STAB PEP-8 (P-3) | 100 | 100 | 100 | 24.0 | 20.1 | 17.9 |
| ADK STAB HP-10 (P-5) | 100 | 100 | — | 19.2 | 16.8 | — |
| Irgafos168 (P-1) | 100 | 100 | — | 19.4 | 17.6 | — |

TABLE 3

Evaluation results

Phosphorus antioxidant and antioxidant with hindered phenol skeleton

| | Capillary force generating member | | | | |
|---|---|---|---|---|---|
| | Core material (PP) | Sheath material (PE) | Ink tank exterior | Printing quality | Filter clogging |
| Ex. 1 | P-1 (Irgafos168) H-1 | P-2 (ADK STAB PEP-36) H-2 | None H-3 | B | A |
| Ex. 2 | P-5 (ADK STAB HP-10) H-1 | P-3 (ADK STAB PEP-8) H-2 | None H-3 | A | A |
| Ex. 3 | None None | None None | P-4 (Sumilizer GP) | A | A |
| Com. Ex. 1 | P-6 (ADK STAB PEP-24G) H-1 | P-1 (Irgafos168) H-2 | None H-3 | C | C |

As shown in Table 2, all of the phosphorus antioxidants used in the Examples had longer elution time (retention time) and higher hydrophobicity than ADK STAB PEP24G (trade name) (Asahi Denka Co., Ltd.) (bis(2,6-di-t-butylphenyl) pentaerythritol diphosphite) Ink tanks of Examples 1, 2 and 3 using members (capillary force generating member or ink tank exterior) formed of a polyolefin resin containing such a phosphorus antioxidant and an antioxidant with a hindered phenol skeleton exhibited excellent results in the evaluation of printing quality and filter clogging.

On the other hand, the ink tank of Comparative Example 1 using a capillary force generating member including a core material and sheath material was inferior to the ink tanks of Examples 1, 2 and 3 in the evaluation of printing quality and filter clogging as shown in Table 3. The core material contains ADK STAB PEP24G (trade name) (Asahi Denka Co., Ltd.) and an antioxidant with a hindered phenol skeleton, and the sheath material contains Irgafos 168 (trade name) (Ciba Specialty Chemicals) more hydrophobic than ADK STAB PEP24G (trade name) (Asahi Denka Co., Ltd.) and an antioxidant with a hindered phenol skeleton.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-151980, filed May 31, 2006, which is hereby incorporated by reference herein in its entirety.

What is claimed is:

1. An ink jet ink reservoir used for ink jet recording, the ink jet ink reservoir receiving a capillary force generating member constituted by an aggregate of fiber, wherein the fiber constituting the capillary force generating member is formed by drawing at least one polyolefin resin, the polyolefin resin comprising an antioxidant at least with a hindered phenol skeleton and a phosphorus antioxidant as an additive, wherein the fiber constituting the capillary force generating member comprises an oxide of the phosphorus antioxidant, the oxide being produced by oxidation of the phosphorous antioxidant with thermal energy generated during processing or production of the capillary force generating member, wherein the oxide has an elution time, measured by liquid chromatography, longer than that of an oxide of bis(2,6-di-t-butylphenyl)pentaerythritol diphosphite, and wherein the phosphorus antioxidant is at least one selected from the group consisting of 6-[3-(3-t-butyl-4-hydroxy-5-methyl)propoxy]-2,4,8,10-tetra-t-butyldibenz[d,f][1,3,2]-dioxaphosphepin and 2,2'-methylenebis(4,6-di-t-butylphenyl)octylphosphite.

2. An ink jet ink reservoir according to claim 1, wherein a reversed-phase silica column is used for the liquid chromatography, methanol/water mixture is used as an eluant, and the elution time is measured while the volume ratio of methanol/water is continuously varied from 70/30 to 100/0 (mass ratio).

* * * * *